(12) United States Patent
Schnell et al.

(10) Patent No.: US 10,593,238 B2
(45) Date of Patent: Mar. 17, 2020

(54) ILLUMINATED ADDRESS NUMBER ASSEMBLY

(71) Applicants: Michael Schnell, Wadsworth, OH (US); James E. Carpenter, Ostrander, OH (US)

(72) Inventors: Michael Schnell, Wadsworth, OH (US); James E. Carpenter, Ostrander, OH (US)

( * ) Notice: Subject to any disclaimer, the term of this patent is extended or adjusted under 35 U.S.C. 154(b) by 0 days.

(21) Appl. No.: 16/289,837

(22) Filed: Mar. 1, 2019

(65) Prior Publication Data

US 2019/0272778 A1    Sep. 5, 2019

Related U.S. Application Data

(60) Provisional application No. 62/637,579, filed on Mar. 2, 2018.

(51) Int. Cl.

| | |
|---|---|
| *G09F 13/06* | (2006.01) |
| *A47G 29/12* | (2006.01) |
| *A47G 29/122* | (2006.01) |
| *H05B 47/19* | (2020.01) |
| *F21Y 115/10* | (2016.01) |
| *G09F 13/04* | (2006.01) |
| *F21S 4/10* | (2016.01) |
| *H02J 7/35* | (2006.01) |
| *G09F 13/22* | (2006.01) |

(52) U.S. Cl.
CPC ........... *G09F 13/06* (2013.01); *A47G 29/122* (2013.01); *A47G 29/1209* (2013.01); *F21S 4/10* (2016.01); *G09F 13/22* (2013.01); *H02J 7/35* (2013.01); *H05B 47/19* (2020.01); *F21Y 2115/10* (2016.08); *G09F 2013/0477* (2013.01); *G09F 2013/222* (2013.01)

(58) Field of Classification Search
None
See application file for complete search history.

(56) References Cited

U.S. PATENT DOCUMENTS

| | | | |
|---|---|---|---|
| 2,452,667 | A | 11/1948 | Lambert |
| 4,872,610 | A | 10/1989 | Grabowiecki |
| 5,460,325 | A | 10/1995 | Surman |
| 6,299,325 | B1 | 10/2001 | Cathel |
| 6,719,193 | B2 | 4/2004 | Katulka |

(Continued)

*Primary Examiner* — Ashok Patel
(74) *Attorney, Agent, or Firm* — Boudwin Intellectual Property; Daniel Boudwin

(57) ABSTRACT

An illuminated address number assembly. The illuminated address number assembly includes a housing having a light source therein and fasteners disposed on an outer surface thereof, wherein the fastener secures the housing to an object, such as a mailbox or fence post. The housing further includes one or more cutouts disposed on opposing lateral sides of the housing wherein the cutouts take the shape of letters and/or numbers. The cutouts allow the light source to shine through, such that the cutouts are illuminated. The light source is operably connected to a power source, such as a solar panel or a battery, or hardwired electrical circuit. A wireless transceiver is disposed within the housing and operably connected to the light source, such that the light source can be selectively actuated via wireless communication. The device may further include a wall mounted switch, such that a user can manually actuate the lights.

15 Claims, 5 Drawing Sheets

(56) References Cited

U.S. PATENT DOCUMENTS

| | | | | |
|---|---|---|---|---|
| 2004/0083634 A1* | 5/2004 | Blsson | ............... | G09F 13/04 40/566 |
| 2015/0294603 A1* | 10/2015 | Braunstein | ......... | H05B 37/0245 315/86 |
| 2018/0033259 A1* | 2/2018 | Cummings | ............. | G08B 5/38 |

* cited by examiner

ILLUMINATED ADDRESS NUMBER ASSEMBLY

CROSS REFERENCE TO RELATED APPLICATIONS

This application claims the benefit of U.S. Provisional Application No. 62/637,579 filed on Mar. 2, 2018. The above identified patent application is herein incorporated by reference in its entirety to provide continuity of disclosure.

BACKGROUND OF THE INVENTION

The present invention relates to address and numbering indicia. More specifically, the present invention provides an illuminated address number assembly that includes a housing containing a lighting source and having fasteners disposed on an outer surface thereof, wherein a plurality of cutouts in opposing lateral sides of the housing take the shape of letters and numbers and are illuminated from the lighting source within the housing. The lighting source or plurality of lighting sources are operably connected to a remote switch through wireless communication, which allows the light sources to be actuated electronically. The light source may also be hardwired to an electrical circuit and connected to a manual switch.

Many people have difficulty reading traditional mailbox and house numbers from a distance or from the vantage point of a slowly moving car. The difficulty is amplified at night or in low lighting conditions. Furthermore, when inclement weather occurs, it can be almost impossible to read standard house numbers. This can create dire circumstances in an emergency situation. Specifically, if emergency response personnel are unable to locate a house because of impaired visibility of the house number, a person in need of emergency assistance may be delayed in getting that help or even put at further risk of injury or even death. Therefore, an illuminated address number assembly that can flash various colors of light and visibly warn emergency responders is needed.

Devices have been disclosed in the known art that relate to illuminated address number cutouts on opposing lateral sides of a box wherein a light source is housed within the box. These include devices that have been patented and published in patent application publications. One of these devices relates to an illuminated house fixture a rectangular frame with opaque numbers and a light producing element housed within the compartment. Another device relates to a mailbox indication device of a generally rectangular shape mounted on a top portion of a mailbox containing a light source powered by a solar rechargeable battery. These devices in the known art, however, fail to disclose an illuminated address number assembly wherein a plurality of lights is housed in the box and operably connected to a remote switch where each of the plurality of lights is a different wavelength and each light is actuated by a different button representing a sub-switch of the remote switch.

In light of the devices disclosed in the known art, it is submitted that the present invention substantially diverges in design elements from the known art and consequently it is clear that there is a need in the art for an improvement to existing illuminated address indicia. In this regard, the instant invention substantially fulfills these needs.

SUMMARY OF THE INVENTION

In view of the foregoing disadvantages inherent in the known types of illuminated address indicia now present in the known art, the present invention provides an illuminated address number assembly wherein the same can be utilized for providing convenience for the user when indicating the correct address to emergency personnel or delivery persons driving by from the street.

It is therefore an object of the present invention to provide a new and improved illuminated address number assembly that has all of the advantages of the known art and none of the disadvantages. The present system comprises a housing of opposing elongated sidewalls having a pair of end walls as well as a top and a bottom wall enclosing an interior volume, wherein a plurality of light sources and a power source are operably connected to one another and disposed within the housing, a remote switch which is in wireless communication with the power source selectively controls the plurality of light sources.

It is another object of the present invention to provide an illuminated address number assembly wherein the power source comprises a solar-rechargeable battery which is operably connected to a solar collector panel disposed on a top surface of the illuminated address number assembly to allow renewable recharging and operation.

Another object of the present invention is to provide an illuminated address number assembly wherein the wireless communication between the remote switch and the power source is achieved via Bluetooth and multiple actuators disposed on the remote switch correspond to different wavelengths to be emitted by the power source, which in turn correspond to different colors being emitted by the plurality of light sources disposed within the housing.

Yet another object of the present invention is to provide an illuminated address number assembly wherein the address indicia disposed on the opposing lateral sidewalls comprises customized perforated knockouts on the surface of the sidewalls as well as other embodiments that comprise interchangeable address indicia that is superimposed over a transparent portion of the opposing sidewalls.

Another object of the present invention is to provide an illuminated address number assembly wherein the fasteners disposed on an outer surface of the housing comprise mounting brackets to allow for the illuminated address number assembly to be affixed to walls and posts.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
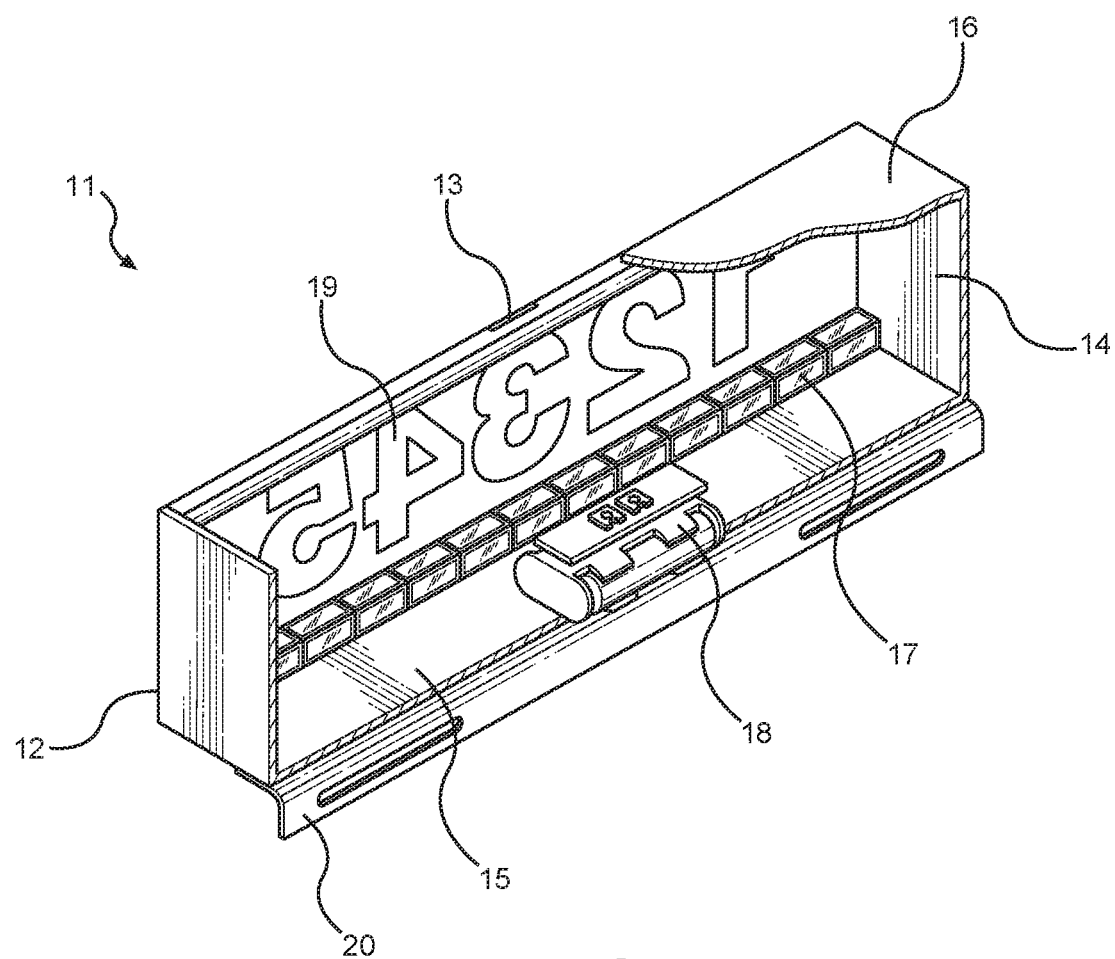
FIG. 1 shows a perspective view of an embodiment of the illuminated address number assembly with one sidewall removed for visibility.

Reference is made herein to the attached drawings. Like reference numerals are used throughout the drawings to depict like or similar elements of the illuminated address number assembly. For the purposes of presenting a brief and clear description of the present invention, the preferred embodiment will be discussed as used for affixing to mailboxes, fence posts, or exterior building walls for increased visibility of an address for deliveries and emergency personnel. The figures are intended for representative purposes only and should not be considered to be limiting in any respect.

Referring now to FIG. 1, there is shown a perspective view of an embodiment of the illuminated address number assembly with one sidewall removed for visibility. The illuminated address number assembly 11 comprises a housing 12 wherein opposing sidewalls 13 are formed from elongated planar surfaces. Two end walls 14 and a top wall 16 and bottom wall 15 complete the housing 12 and form an enclosure with an inside volume. A plurality of light sources 17 are operably connected to a power source 18 wherein both the plurality of light sources 17 and power source 18 are disposed inside the housing 12. The power source 18 may be selectively engaged to activate the plurality of light 17 sources for providing illumination. Address indicia 19 is provided on the surface of the opposing sidewalls 13, through which the plurality of light sources 17 may shine through to illuminate the address for emergency personnel and passersby. In the illustrated embodiment, the address indicia 19 are provided in the form of cutouts on the surface of the sidewalls 13 which take the form of numbers and/or letters to correspond with the desired address. In alternate embodiments of the illuminated address number assembly 11, the address indicia 19 may be provided by interchangeable indicia which may be superimposed over a transparent section of the opposing sidewalls 13. Fasteners 20 are disposed on an outside surface of the housing 12 to allow for the illuminated address number assembly 11 to be affixed to a surface.

Figure 2:
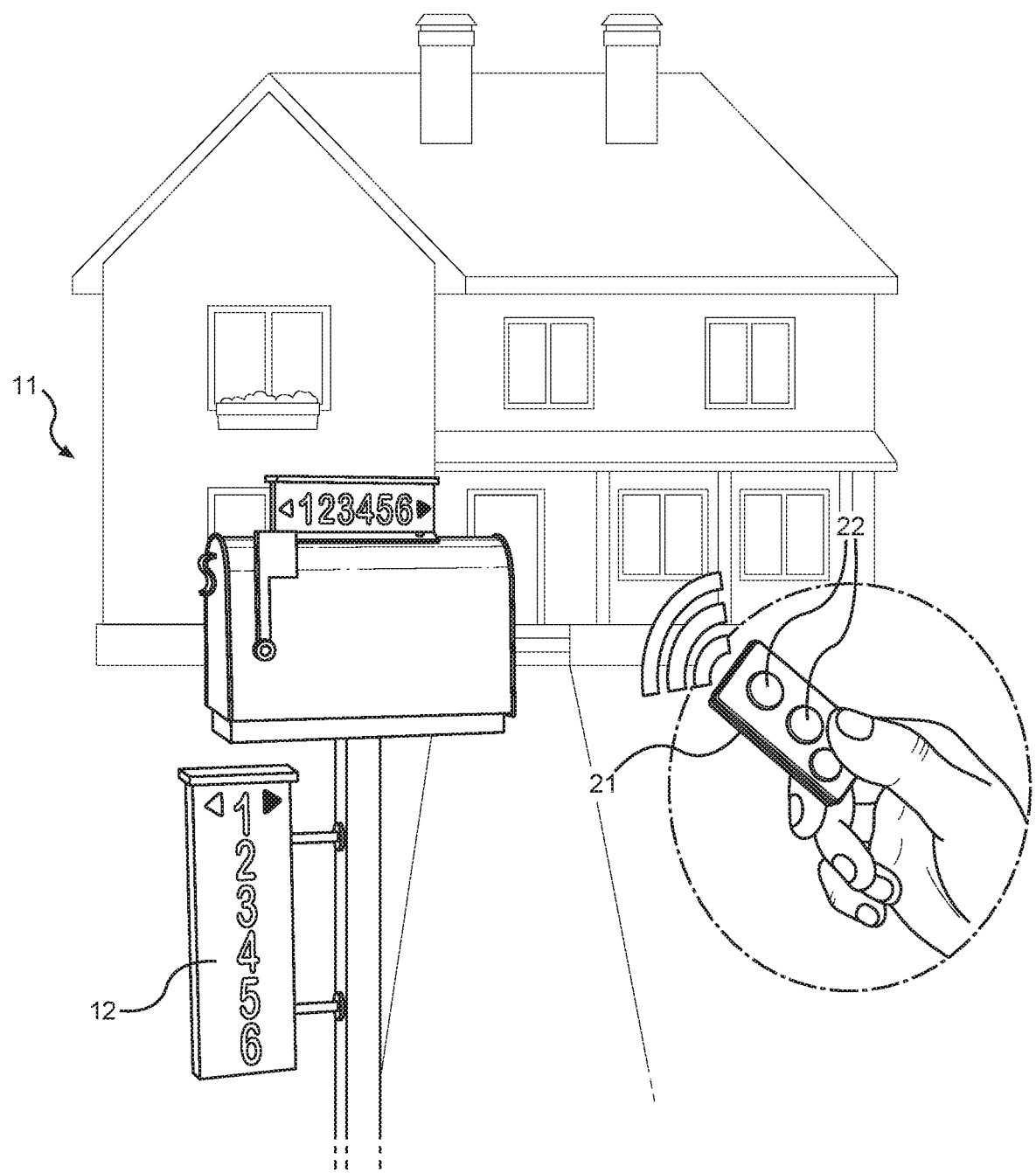
FIG. 2 shows a perspective view of an embodiment of the illuminated address number assembly wherein the remote switch actuates the plurality of light sources.

Referring now to FIG. 2, there is shown a perspective view of an embodiment of the illuminated address number assembly wherein the remote switch actuates the plurality of light sources. The power source 18 is disposed within the housing 12. A wireless transceiver is disposed within the housing and is operably connected to the light source 17, such that the light source 17 is selectively actuated by wireless communication from the remote switch 21. The remote switch 21 allows a user to selectively engage the illuminated address number assembly 11. In this way, a remote control or a mobile device which incorporates the remote switch 21 can activate and deactivate the lights. Actuators 22 disposed on the remote switch 21 are utilized to select pre-defined wavelengths, and therefore colors, being emitted by the light source 17 thereby resulting in the selection of the color being illuminated through the address indicia by the light source 17. In one embodiment, the light source 17 includes a plurality of colored light sources, wherein each of the colored light sources produces a different wavelength, and therefore color of light emitted thereby. In a further embodiment, the remote switch 21 includes a plurality of sub-switches that correspond to each pre-defined wavelength of light, and where each of the plurality of sub-switches are actuated, an illuminated color is emitted by the light source 17. For example, a blue sub-switch, when actuated, causes a blue light to be emitted by the light source 17. In this manner, the user can selectively choose a specific color to correspond with the desired need, such as a red light for fire emergencies or a blue light for police emergencies. In another embodiment, a user is able to select between settings, such as illumination brightness or a strobe effect for increased visibility during emergencies, through the remote switch 21.

In the illustrated embodiment, the plurality of light sources illuminating the address indicia is provided by a string of LED lights disposed along an interior surface of the housing 12 and capable of emitting multiple colors. In alternate embodiments, the remote switch 21 may be replaced with a wall-mounted switch having a direct connection with the power source to manually activate and deactivate the plurality of light sources.

Figure 3:
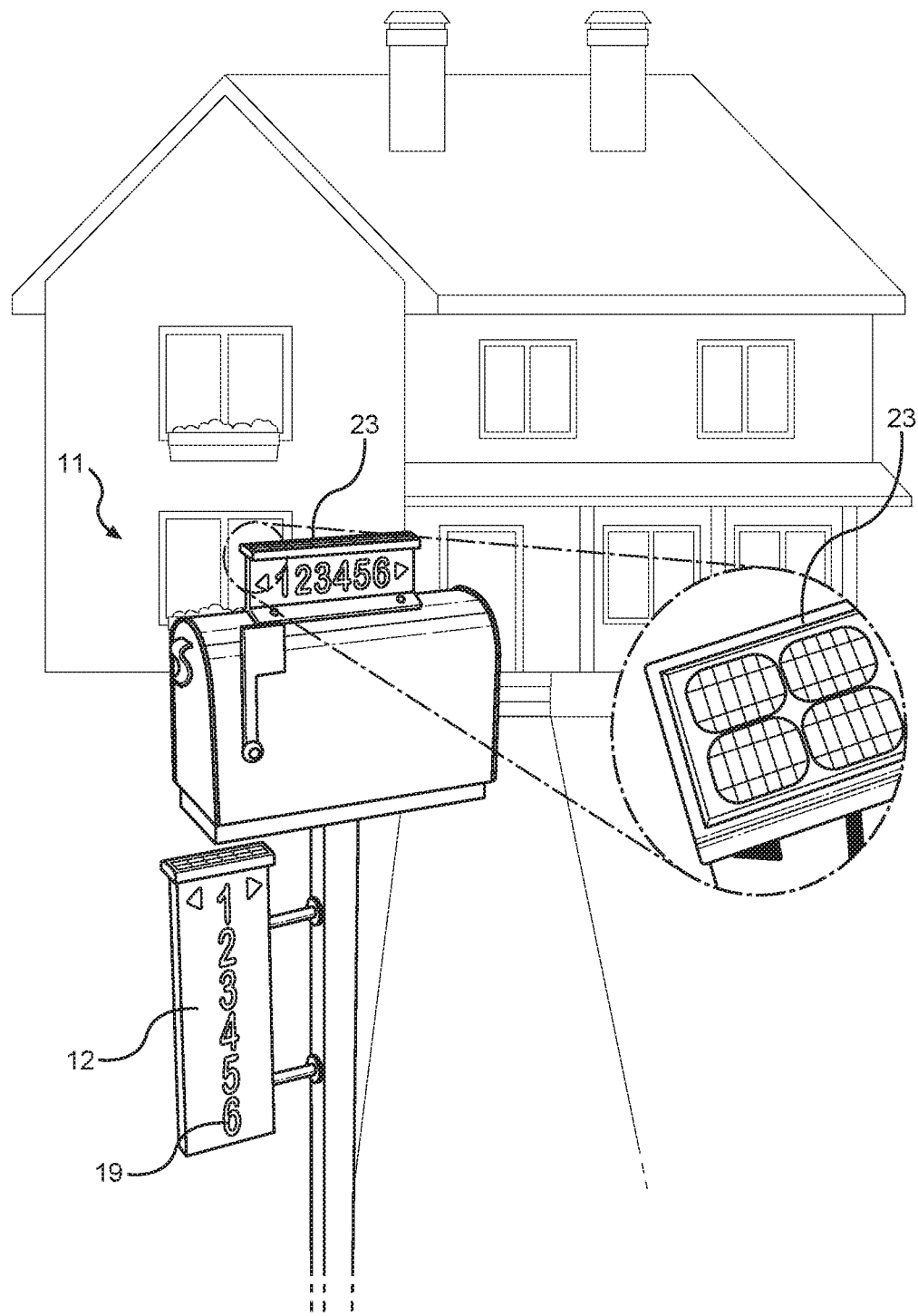
FIG. 3 shows a perspective view of an embodiment of the illuminated address number assembly secured to a mailbox with solar panel disposed on top.

Referring now to FIG. 3, there is shown a perspective view of an embodiment of the illuminated address number assembly secured to a mailbox with solar panel disposed on top. In one embodiment of the illuminated address number assembly 11a rechargeable solar-powered battery provides the power source. A solar collection panel 23 disposed on a top surface of the housing 12 of the illuminated address number assembly 11 is operably connected to the rechargeable battery to provide a self-contained source of renewable power to run the plurality of light sources used in illuminating the address indicia 19. In other embodiments of the illuminated address number assembly 11, the power source may comprise a traditional battery as well as a direct hardwired connection to an electrical power grid. The power source may also illuminate an arrow included with the address indicia for better indicating the specific locations.

Figure 4:
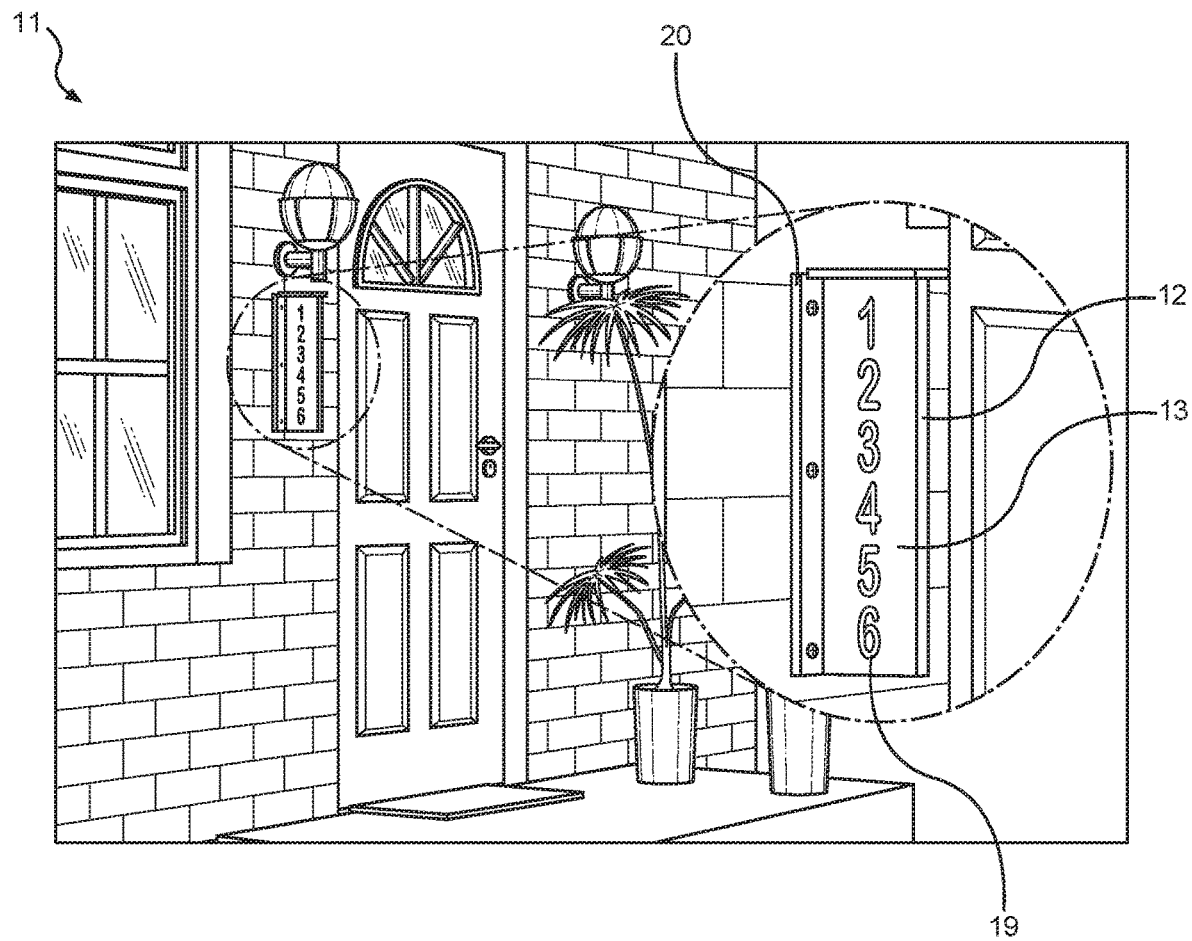
FIG. 4 shows a perspective view of an embodiment of the illuminated address number assembly affixed to the exterior wall of a house.
Figure 5:
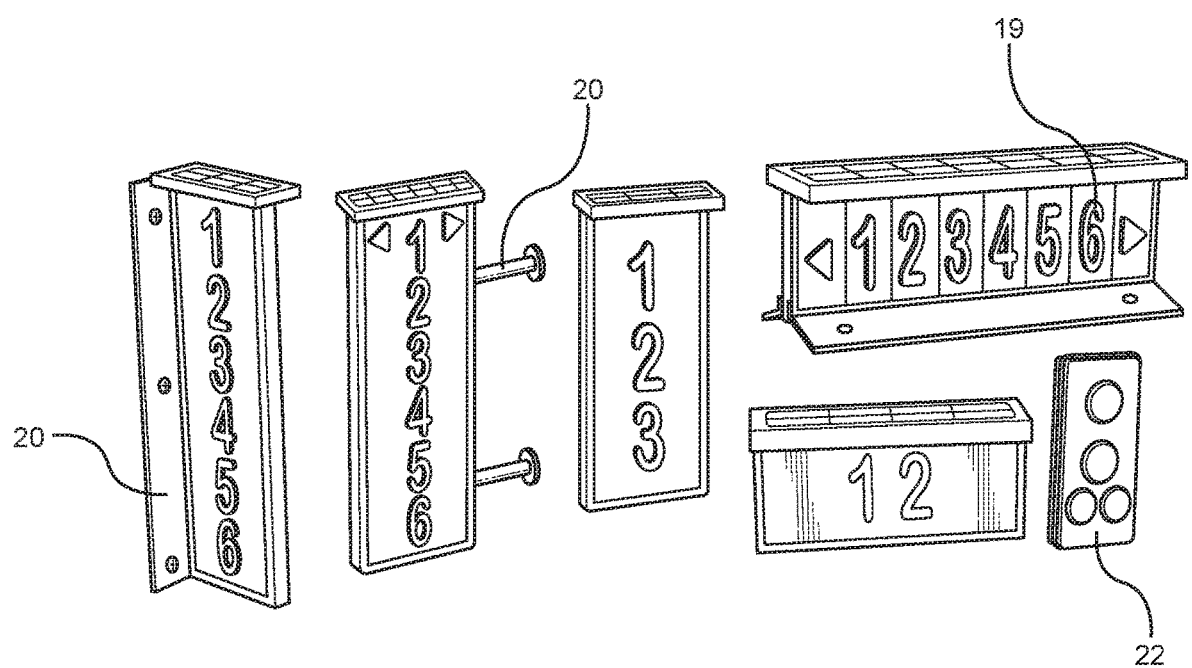
FIG. 5 shows a perspective view of an embodiment of the illuminated address number assembly with various other embodiments of the illuminated address number assembly also shown.

Referring now to FIGS. 4 and 5, there is shown a perspective view of an embodiment of the illuminated address number assembly affixed to the exterior surface of a house and a perspective view of an embodiment of the illuminated address number assembly with various other embodiments of the illuminated address number assembly also shown. Fasteners 20 disposed on an outside surface of the housing 12 allow a user to affix the illuminated address number assembly 11 to surfaces such as the exterior wall of a building or structure, mailboxes, lamp posts, and other conspicuous places to allow for increased visibility from street view for deliveries and emergency personnel. In the illustrated embodiment, the fasteners 20 disposed on outside surface of the housing 12 are comprised of mounting brackets including apertures adapted to receive anchoring apparatus such as a screw, pin, nail, dowel or rivet. In other embodiments of the illuminated address number assembly 11, the fasteners 20 are located along one of the opposing sidewalls 13 to allow for the illuminated address number assembly 11 to lay flat against an exterior wall of a building or structure. Other embodiments include a hinge coupling or securing means to allow for the illuminated address number assembly 11 to be mounted atop a mailbox. In such embodiments, the sidewall that contacts the mailbox may be curved to conform to the shape of a typical mailbox having a curved upper surface. The address indicia 19 may be oriented in either vertical or horizontal orientation to allow for hanging of the housing 12 by both length-wise and width-wise. Other embodiments may also an electron application controllable from a smart phone to serve as the remote switch for users to selectively engage the illuminated address number assembly 11.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated address number assembly, comprising:
   a housing comprising a pair of opposing sidewalls, a pair of end walls, a top wall and a bottom wall together defining an enclosed interior volume within the housing;
   address indicia disposed on at least one of the opposing sidewalls of the housing;
   fasteners disposed along an outer surface of the housing configured to secure the housing to an external surface;
   a plurality of light sources disposed within the housing and operably connected to a power source also disposed within the housing;
   a wireless transceiver disposed within the housing and operably connected to the plurality of light sources, wherein the plurality of light sources is selectively actuated by wireless communication from a remote switch;
   the remote switch further comprising a plurality of sub-switches, wherein actuation of each of the plurality of sub-switches results in a pre-defined wavelength of light to be emitted from the light source.

2. The illuminated address number assembly of claim 1, wherein the power source disposed within the housing comprises a solar-rechargeable battery.

3. The illuminated address number assembly of claim 2, wherein a solar collector panel is affixed on a top surface of the housing and operably connected to the solar-rechargeable battery.

4. The illuminated address number assembly of claim 1, wherein the wireless communication between the remote switch and the power source is achieved via Bluetooth connection.

5. The illuminated address number assembly of claim 1, wherein the plurality of light sources disposed within the housing further comprise a plurality of colored light sources.

6. The illuminated address number assembly of claim 5, wherein each of the plurality of colored light sources produces a pre-defined wavelength emitted from the colored light source.

7. The illuminated address number assembly of claim 5, wherein actuators disposed on the remote switch correspond with pre-defined wavelengths to allow a user to selectively change the color displayed by the plurality of light sources.

8. The illuminated address number assembly of claim 1, wherein the plurality of light sources can be set to a strobe function using the remote switch.

9. The illuminated address number assembly of claim 1, wherein the address indicia disposed on the opposing sidewalls of the housing comprise customized perforated cutouts within the sidewalls.

10. The illuminated address number assembly of claim 1, wherein at least one portion of the sidewalls is transparent, thereby enabling a user to superimpose the transparent portion of the sidewalls with at least one interchangeable address indicia.

11. The illuminated address number assembly of claim 1, wherein the fasteners disposed on the outer surface of the housing comprise mounting brackets.

12. The illuminated address number assembly of claim 1, wherein fasteners disposed on one of the opposing sidewalls allows the housing to be affixed flat against a surface.

13. The illuminated address number assembly of claim 1, wherein the plurality of light sources is provided by a string of LED lights disposed along the interior surface.

14. The illuminated address number assembly of claim 1, further comprising a hinge coupling disposed along an outer surface of the housing.

15. The illuminated address number assembly of claim 1, wherein the housing further comprises a curve that mimics a curve of a desired surface onto which the illuminated address number assembly is to be mounted.

* * * * *